United States Patent [19]
Griffith et al.

[11] 3,974,239
[45] Aug. 10, 1976

[54] MANUFACTURE OF IMPACT-RESISTANT OLEFINIC-NITRILE COPOLYMERS

[75] Inventors: Russell K. Griffith, Chagrin Falls; John F. Jones, Cuyahoga Falls, both of Ohio

[73] Assignee: Standard Oil Company, Cleveland, Ohio

[22] Filed: Sept. 2, 1975

[21] Appl. No.: 609,373

Related U.S. Application Data

[63] Continuation of Ser. No. 222,979, Feb. 2, 1972, abandoned.

[52] U.S. Cl. ............................................... 260/879
[51] Int. Cl.² ............... C08F 291/04; C08F 291/06; C08F 291/12
[58] Field of Search .................................... 260/879

[56] References Cited
UNITED STATES PATENTS

| | | | |
|---|---|---|---|
| 3,426,102 | 2/1969 | Solak et al. | 260/879 X |
| 3,438,926 | 4/1969 | Burke et al. | 260/879 X |
| 3,451,538 | 6/1969 | Trementozzi | 260/879 X |
| 3,538,194 | 11/1970 | Burrett et al. | 260/879 X |
| 3,803,265 | 4/1974 | Griffith | 260/879 |

*Primary Examiner*—William F. Hamrock
*Attorney, Agent, or Firm*—John F. Jones; Sherman J. Kemmer

[57] ABSTRACT

Impact-resistant polymers which have low permeability to gases and vapors are prepared by polymerizing an olefinic nitrile, such as acrylonitrile, optionally with an acrylic ester, such as methyl acrylate, to at least about 70% conversion, and then introducing into the polymerization reaction medium a conjugated diene monomer, such as butadiene-1,3, and completing the polymerization reaction in the presence of said diene monomer.

9 Claims, No Drawings

MANUFACTURE OF IMPACT-RESISTANT OLEFINIC-NITRILE COPOLYMERS

This is a continuation of application Ser. No. 222,979, filed Feb. 2, 1972, now abandoned.

The present invention relates to the manufacture of polymeric resins which have low permeability to gases, and more particularly pertains to impact-resistant, thermoplastic polymeric resins which function as gas and vapor barrier materials and which are composed of a conjugated diene monomer, an olefinically unsaturated nitrile, and optionally an ester of an olefinically unsaturated carboxylic acid, and particularly pertains to a novel process for preparing these polymeric materials.

The process of the present invention represents an improvement over the processes disclosed in commonly assigned U.S. Pat. Nos. 3,426,102 and 3,586,737 which describe the preparation of impact-resistant vapor and gas barrier resins composed of an olefinic nitrile, such as acrylonitrile, optionally an acrylic ester, and a preformed diene rubber, wherein the preformed diene rubber is present during the resin polymerization reaction. The prior art processes for manufacture of impact-resistant, rubber-modified resins usually require at least two steps, i.e., rubber preparation and graft polymerization of the resin monomers in the presence of the rubber.

The products of the novel process of the present invention, which appear to have all of the desired properties usually found in rubber-modified resins such as impact resistance, clarity, and processability, can be prepared in a single reactor from simple monomeric materials and do not require the inclusion of a preformed rubber of any type. The products of the present invention are prepared by polymerizing a major portion of an olefinically unsaturated nitrile, such as acrylonitrile, and optionally a minor portion of an ester of an olefinically unsaturated carboxylic acid, such as methyl acrylate, to a conversion of at least about 70% by weight of monomers to polymer and then the polymerization is continued in the presence of a conjugated diene monomer, such as butadiene-1,3.

The conjugated diene monomers useful in the present invention include butadiene-1,3, isoprene, chloroprene, bromoprene, cyanoprene, 2,3-dimethylbutadiene-1,3, and the like, and others. Most preferred for the purpose of this invention are butadiene and isoprene because of their ready availability and their excellent copolymerization properties.

The olefinically unsaturated nitriles useful in the present invention are the alpha,beta-olefinically unsaturated mononitriles having the structure

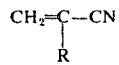

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The esters of olefinically unsaturated carboxylic acids useful in the present invention are preferably the lower alkyl esters of alpha,beta-olefinically unsaturated carboxylic acids, and more preferred are the esters having the structure

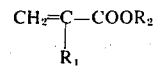

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl,alpha-chloroacrylate, ethyl,alphachloroacrylate, and the like. Most preferred in the present invention are methyl acrylate, ethyl acrylate, methyl methacrylate, and ethyl methacrylate.

The polymeric compositions of the present invention can be prepared by any of the known general techniques of emulsion or suspension polymerization techniques by batch, continuous or intermittent addition of the monomers and other components so long as the conjugated diene monomer component is not added until at least about 70% by weight of the other monomer components are converted to polymer. The preferred method is aqueous emulsion or suspension polymerization. The polymerization is preferably carried out in an aqueous medium in the presence of an emulsifying agent and a free-radical generating polymerization initiator at a temperature of from about 0°C to 100°C in the substantial absence of molecular oxygen. The simultaneous interpolymerization of a mixture of the conjugated diene monomer, the olefinically unsaturated nitrile, and the ester of an olefinically unsaturated carboxylic acid does not produce polymeric products which resemble the polymeric products resulting from the instant process.

The preferred polymeric compositions embodied herein are those resulting from the polymerization to at least 70% by weight conversion of 100 parts by weight of (A) at least 70% by weight of at least one nitrile having the structure

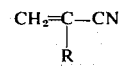

wherein R has the foregoing designation and (B) up to 30% by weight based on the combined weights of (A) and (B) of at least one ester having the structure

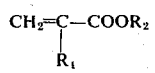

wherein $R_1$ and $R_2$ have the foregoing designations and then including in the polymerization medium from 1 to 40 parts by weight per 100 parts by weight of (A) + (B) of (C) a monomer component having at least one conjugated diene monomer selected from the group consisting of butadiene and isoprene, and continuing the polymerization to a final conversion of from 80 to 100% by weight of monomers to polymer.

More specifically, the present invention can be illustrated in the polymerization of a mixture of acrylonitrile and methyl acrylate to a conversion of at least 80% by weight of monomers to polymer and then adding butadiene-1,3 and completing the polymerization reaction to produce a polymer having excellent impact strength and exceptionally good impermeability to gases and vapors when exposed to said gases or vapors in the form of a film or thin sheet. Preferably, the acrylonitrile-methyl acrylate monomer feed should contain at least 70% by weight of acrylonitrile based on the combined weights of acrylonitrile and methyl acrylate, and more preferably the acrylonitrile fed to the polymerization reaction should be on the order of from 70 to 90% by weight based on the combined weights of all the acrylonitrile and methyl acrylate used in the polymerization.

In the foregoing polymerization it is preferred that from about 1 to 40, and preferably 1 to 20, parts of the conjugated diene monomer component be employed in the polymerization according to the process of this invention for each 100 parts of combined acrylonitrile and methyl acrylate monomer component. It has been found that as the relative amount of the diene monomer component is increased in the final polymeric product, the impact strength increases and the gas and vapor barrier properties decrease somewhat. It is generally preferred to use just enough of the conjugated diene monomer component to impart the desired impact strength to the polymeric product and at the same time to retain the optimum gas and vapor barrier properties of the polymeric product.

The polymeric products of the process of the present invention are readily processable, impact-resistant (i.e., having notched Izod impact strengths of at least 0.5 foot pounds per inch of notch) thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance and their impact strength and low permeability to gases and vapors make them very useful in the packaging industry and make them very useful materials from which to manufacture bottles, film, and other types of containers for liquids and solvents. The low permeability of the novel resins produced by the process of this invention to gases such as oxygen and carbon dioxide make them particularly useful materials for the fabrication of bottles for carbonated beverages and vegetable oils.

In the following illustrative examples, the amounts of ingredients are expressed in parts by weight unless otherwise specified.

EXAMPLE 1

A. A resin was prepared which is outside the scope of the present invention by the polymerization of a mixture of the following ingredients:

| Ingredient | Parts |
|---|---|
| distilled water | 250 |
| emulsifier (Alipal CO 436)* | 1.5 |
| acrylonitrile | 75 |
| methyl acrylate | 25 |
| limonene dimercaptan | 0.5 |
| $(NH_4)_2S_2O_8$ | 0.06 |
| butadiene | 12.0 |

*Ammonium salt of sulfated nonylphenoxypoly(ethyleneoxy) ethanol.

The polymerization was carried out at 60°C after first charging the above ingredients in a polymerization reactor, sweeping out substantially all of the air in the reactor with nitrogen gas. During the polymerization the contents of the reactor were stirred constantly and a total reaction time of 16 hours was used. The product was a latex of solid resin representing a conversion of monomers to polymer of 85.5%.

The resin was isolated by coagulation with methanol followed by washing and vacuum drying. The resin was compression molded into test bars which were found to have a notched Izod impact strength of only 0.19 foot pounds per inch of notch. The Brabender plasticorder torque (230°C and 35 rpm to constant torque) for this material was found to be irregular at 3250 meter grams and the resin decomposed or burned in the Brabender within 5 minutes of this test. This indicates that the resin is not processable in the usual types of equipment used for processing thermoplastic resins.

B. A resin within the scope of this invention was prepared following the recipe and procedure described in A of this example except that no butadiene was included in the initial polymerization reaction and the butadiene was added all at once to the polymerization reaction mixture after 89.5% conversion of the acrylonitrile-methyl acrylate monomer mixture to polymer was achieved. The polymerization after the addition of the butadiene was allowed to continue and 93% conversion of all monomers to polymer was achieved. The resin was recovered from its latex by coagulation, washing and drying. The resin was found to have the following properties:

| | |
|---|---|
| notched Izod impact strength | 6.3 foot pounds per inch of notch |
| Brabender plasticorder torque | 1890 meter grams (did not change appreciably after 5 minutes mixing with Brabender) |
| ASTM heat distortion temperature | 70°C |
| flexural strength | $13 \times 10^3$ psi |
| flexural modulus | $4.8 \times 10^5$ psi |
| tensile strength | $9.9 \times 10^3$ psi |
| hardness, Rockwell "M" | 69 |
| water vapor transmission | 5.0 grams/mil/100 inches²/ 24 hours/100°F/90% relative humidity (ASTM E-96-63) |
| oxygen transmission | 1.0 cc/mil/100 inches²/24 hours/ atmosphere/73°F (ASTM D-1434-66) |

C. Another resin which is outside the scope of the present invention was produced by repeating the procedure of B above except that the butadiene was added to the reaction mixture at about 50% conversion of the acrylonitrile-methyl acrylate monomer reaction to polymer. A final total conversion of all of the monomers to polymer of 86.4% was achieved. The resin was recovered from its latex and was found to have the following properties:

| | |
|---|---|
| notched Izod impact strength | 0.36 foot pounds per inch of notch |
| Brabender plasticorder torque | 2420 meter grams (burned in the Brabender) |

D. Another resin within the scope of the present invention was prepared by repeating the procedure of B above except that the conversion of the acrylonitrile-methyl acrylate monomer mixture was carried essentially to completion (16.1 hours on stream) before the butadiene (11.6 parts) was added to the polymerization reaction and the reaction was continued for another 6 hours. The final conversion of all monomers to polymer was 91.0%. The resin was isolated and was found to have the following properties:

| | |
|---|---|
| notched Izod impact strength | 0.65 foot pounds per inch of notch |
| Brabender plasticorder torque | 2690 meter grams |

EXAMPLE 2

A. A copolymer of acrylonitrile and methyl acrylate was prepared in accordance with the procedure of Example 1 from the following ingredients:

| Ingredient | Parts |
|---|---|
| water | 156 |
| acrylonitrile | 75 |
| methyl acrylate | 25 |
| emulsifier (GAFAC RE 610)* | 3 |
| modifier (Mercaptate Q-43)** | 1.05 |
| ammonia | 0.06 |
| chelating agent (Hampene K-4-100)*** | 0.05 |

*A mixture of R—O—(CH$_2$CH$_2$O—)$_n$PO$_3$M$_2$ and [R—O—(CH$_2$CH$_2$O—)$_n$]$_2$PO$_2$M wherein n is a number from 1 to 40, R is an alkyl or alkaryl group and preferably a nonyl phenyl group, and M is hydrogen, ammonia or an alkali metal.
**The tetra ester of pentaerythritol and beta-mercaptopropionic acid.
***The tetra potassium salt of ethylene diamine tetra acetic acid.

The polymerization was carried to about 99% conversion and the final latex was diluted with water so that it had a total solids of 31%. Part of the latex was coagulated and the polymer was isolated and dried and its physical properties were determined. The polymer was found to have a notched Izod impact strength of only 0.37 foot pounds per inch of notch and a Brabender plasticorder torque of 1300 meter grams.

B. To part of the latex produced in A above were added 11.7 parts per 100 parts of resin of butadiene monomer and 0.05 parts of ammonium persulfate and the polymerization was carried out at 60°C for 7 hours. The final polymer was isolated and dried and its physical properties were determined. This polymer, which is within the scope of the present invention, was found to have a notched Izod impact strength of 1.5 foot pounds per inch of notch and a Brabender plasticorder torque of 2040 meter grams.

EXAMPLE 3

The procedure of Example 1-B was followed except that 95 parts of methacrylonitrile were substituted for the acrylonitrile and 5 parts of methyl methacrylate were substituted for the methyl acrylate, and 19 parts of butadiene were added when 83% conversion of the methacrylonitrile-methyl methacrylate monomer mixture to polymer had occurred. The final polymerization was carried to 90% conversion and the resulting polymer was found to have a notched Izod impact strength of 3.0 foot pounds per inch of notch and a Brabender plasticorder torque of 2400 meter grams.

EXAMPLE 4

The procedure of Example 3 was repeated substituting 70 parts of acrylonitrile for the methacrylonitrile, 30 parts of ethyl acrylate for the methyl methacrylate, and 11.1 parts of butadiene were added at 94.5% conversion of the acrylonitrile-ethyl acrylate monomers to polymer. The final polymerization was carried to 95% conversion and the polymeric product was found to have a notched Izod impact strength of 0.6 foot pounds per inch of notch and a Brabender plasticorder torque of 1470 meter grams.

EXAMPLE 5

The procedure of Example 1-B was repeated except that 17.85 parts of butadiene were added after 92% conversion of the acrylonitrile-methyl acrylate monomer mixture to polymer had occurred. The final polymerization was carried to about 83% conversion and the product isolated therefrom was found to have a notched Izod impact strength of 2.0 foot pounds per inch of notch and a Brabender plasticorder torque of 1520 meter grams.

EXAMPLE 6

The procedure of Example 5 was repeated except that 8.3 parts of butadiene were added after 87% conversion of the acrylonitrile-methyl acrylate monomer mixture to polymer had occurred. The final polymerization was carried to 92% conversion and the polymeric product was found to have a notched Izod impact strength of 1.0 foot pounds per inch of notch and a Brabender plasticorder torque of 2690 meter grams. This polymer in film form was found to have an ASTM oxygen transmission of 1.2 cc/mil/100 inches$^2$/24 hours/atmosphere and an ASTM water vapor transmission of 4.2 grams/mil/100 inches$^2$/24 hours/90% relative humidity/100°F.

EXAMPLE 7

The procedure of Example 6 was repeated except that 9.8 parts of butadiene were added to the reaction when 95% of the acrylonitrile-methyl acrylate monomer mixture had been converted to polymer. The final polymerization was carried to 93.3% conversion and the isolated polymeric product was found to have a notched Izod impact strength of 1.5 foot pounds per inch of notch and a Brabender plasticorder torque of 2150 meter grams.

EXAMPLE 8

The copolymer latex of Example 2-A containing 0.7% unpolymerized monomer was vacuum stripped at 60°C to reduce the residual monomer content to .057% by weight. To the stripped latex were added 10.2 parts of butadiene per 100 parts of resin, and polymerization was carried out to essentially complete conversion to produce a final resin product having a Brabender plasticorder torque of 2180 meter grams and a notched Izod impact strength of 1.2 foot pounds per inch of notch.

EXAMPLE 9

A. According to the procedure described in the previous examples, polymethacrylonitrile was prepared by the polymerization at 60°C of a mixture of the following ingredients:

| Ingredient | Parts |
|---|---|
| water | 250 |
| Alipal CO 436 | 1.5 |
| methacrylonitrile | 100 |
| ammonium persulfate | 0.05 |
| limonene dimercaptan | 0.5 |

The polymerization was carried to 97.6% conversion.

B. Two hundred fifty parts of the latex from A of this example were treated with 0.05 parts of ammonium persulfate and 10.33 parts of butadiene at 60°C in the substantial absence of oxygen for about 24 hours to give a final conversion of 95.4%. The resin was isolated and was found to have the following properties:

| | |
|---|---|
| Brabender plasticorder torque | 2350 meter grams |
| notched Izod impact strength | 1.0 foot pounds per inch of notch |
| ASTM heat distortion temperature | 97°C |
| flexural strength | $15 \times 10^3$ psi |
| flexural modulus | $4.4 \times 10^5$ psi |
| tensile strength | $10 \times 10^3$ psi |

We claim:
1. The process comprising polymerizing in an aqueous medium to at least 70% by weight conversion of a monomer component consisting of
   A. from 70 to 90% by weight of at least one nitrile having the structure

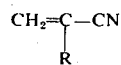

wherein R is a member selected from the group consisting of hydrogen, a lower alkyl group having from 1 to 4 carbon atoms and a halogen, and
   B. from 10 to 30% by weight based on the combined weights of (A) and (B) of at least one ester having the structure

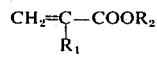

wherein $R_1$ is a member selected from the group consisting of hydrogen, an alkyl group having from 1 to 4 carbon atoms and a halogen, and $R_2$ is an alkyl group having from 1 to 6 carbon atoms,
and then including in the polymerization from 1 to 40 parts by weight per 100 parts by weight of (A) + (B) of (C) a monomer component having at least one conjugated diene monomer selected from the group consisting of butadiene and isoprene, and continuing the polymerization to a final conversion of from 80 to 100% by weight of monomers to polymer.

2. The process of claim 1 carried out in the substantial absence of oxygen and at a temperature in the range of from 0°C to 100°C.

3. The process of claim 2 carried out in an aqueous emulsion.

4. The process of claim 3 wherein the polymerization of monomer component (A) + (B) is carried out to at least 80% by weight conversion before including monomer component (C).

5. The process of claim 4 wherein monomer component (A) is acrylonitrile.

6. The process of claim 4 wherein monomer component (A) is methacrylonitrile.

7. The process of claim 4 wherein monomer component (B) is methyl acrylate.

8. The process of claim 4 wherein monomer component (B) is ethyl acrylate.

9. The process of claim 4 wherein monomer component (C) is butadiene.

* * * * *